(12) United States Patent
Homma et al.

(10) Patent No.: US 7,992,531 B2
(45) Date of Patent: Aug. 9, 2011

(54) PHASE VARYING APPARATUS FOR ENGINE

(75) Inventors: Koichi Homma, Kanagawa (JP); Minoru Shiino, Kanagawa (JP); Naoya Ishihara, Kanagawa (JP)

(73) Assignee: Nittan Value Co., Ltd., Kanagawa (JP)

( * ) Notice: Subject to any disclaimer, the term of this patent is extended or adjusted under 35 U.S.C. 154(b) by 271 days.

(21) Appl. No.: 12/514,295

(22) PCT Filed: Dec. 11, 2006

(86) PCT No.: PCT/JP2006/324640
§ 371 (c)(1),
(2), (4) Date: May 8, 2009

(87) PCT Pub. No.: WO2008/072298
PCT Pub. Date: Jun. 19, 2008

(65) Prior Publication Data
US 2010/0000481 A1 Jan. 7, 2010

(51) Int. Cl.
*F01L 1/34* (2006.01)
(52) U.S. Cl. .................. 123/90.17; 123/90.15
(58) Field of Classification Search ............ 123/90.15, 123/90.17
See application file for complete search history.

(56) References Cited

U.S. PATENT DOCUMENTS

| 5,148,895 | A | 9/1992 | Kakizaki |
| 6,679,209 | B2 * | 1/2004 | Hibi et al. ............... 123/90.17 |
| 2003/0226534 | A1 | 12/2003 | Watanabe et al. |
| 2005/0205030 | A1 | 9/2005 | Okamoto et al. |
| 2009/0183704 | A1 * | 7/2009 | Shiino et al. ............ 123/90.17 |

FOREIGN PATENT DOCUMENTS

| JP | 2002-371814 A | 12/2002 |
| JP | 2003-189510 A | 7/2003 |
| JP | 2005-146993 A | 6/2005 |
| WO | 2006/025173 A1 | 3/2006 |

OTHER PUBLICATIONS

International Search Report for PCT/JP2006/324640 mailed Mar. 13, 2007.

* cited by examiner

*Primary Examiner* — Thomas E Denion
*Assistant Examiner* — Daniel A Bernstein
(74) *Attorney, Agent, or Firm* — Roberts, Mlotkowski, Safran & Cole, P.C.

(57) ABSTRACT

Heat generation is not caused by friction in a phase varying apparatus for use with a vehicle engine. A phase varying apparatus for use with a vehicle engine varies the opening/closing timing of an intake valve or an exhaust valve. The phase varying apparatus includes a rotary drum (44A) screwed to an intermediate member (30); an electromagnetic clutch (42) including a plurality of magnets (80) that are fixedly arranged at predetermined intervals along the circumferential direction of the rotary drum and that are magnetized alternately in opposite directions and a coil wound around an iron core (60); and ferromagnetic-material-made magnetic flux induction members (82, 84) having a plurality of claws (82B, 84B) close to magnetic poles of a magnet, having a slight gap between the iron core and the magnetic flux induction member, and forming a magnetic path (85) made up of the iron core and the magnets. The magnetic flux induction member is fixed to an outer cylinder part (10) or to an inner cylinder part (20). The rotary drum is accelerated and decelerated by a magnetic force exerted on the magnet by the claws while controlling an electric current to be supplied to the coil, and the inner cylinder part (20) and the outer cylinder part connected to the intermediate member in a spline manner are rotated relative to each other.

6 Claims, 11 Drawing Sheets

PHASE VARYING APPARATUS FOR ENGINE

TECHNICAL FIELD

The present invention relates to a phase varying apparatus for use with a vehicle engine that transmits the rotation of a crankshaft of the vehicle engine to a camshaft by which an intake valve or an exhaust valve of the engine is opened and closed and that varies the opening/closing timing of the intake valve or of the exhaust valve according to an operational state, such as an engine load or the number of revolutions of the engine.

PRIOR ART

An apparatus disclosed by Patent Literature 1 mentioned below is known as such a phase varying apparatus. The disclosed apparatus is shown in FIG. 12.

This phase varying apparatus is used in such a manner as to be attached to an engine case (i.e., a cover for the phase varying apparatus), not shown, in order to open and close an intake valve or an exhaust valve, and is composed of an annular outer cylinder part 10, a driven-side, annular inner cylinder part 20, an intermediate member 30, and an electromagnetic brake 40. The annular outer cylinder part 10 has a sprocket 12 in which a driving force of a crankshaft of an engine is transmitted by a chain (not shown). The driven-side, annular inner cylinder part 20 is disposed coaxially with the outer cylinder part 10 so as to be rotatable relative to the outer cylinder part 10, and serves as a part of the camshaft 2. The intermediate member 30 is interposed between the outer cylinder part 10 and the inner cylinder part 20 in the state of having a helical spline engagement with the outer cylinder part 10 and with the inner cylinder part 20, and varies the phase of the inner cylinder part 20 with respect to the outer cylinder part 10 while moving in an axial direction. The electromagnetic brake 40 is disposed on the side opposite to the side on which the camshaft 2 of the inner cylinder part 20 is disposed, and serves as an electromagnetic control means for moving the intermediate member 30 in the axial direction. The camshaft 2 has a cam 2a used to open and close one of the intake and exhaust valves.

The outer cylinder part 10 is composed of a sprocket 12 having a ring-like concave part 13 formed at its inner peripheral edge; an inner flange plate 14 that is in close contact with a side surface of the sprocket 12 and that defines a flange engagement groove 13A in cooperation with the concave part 13; and a spline case 16 that co-fastens the inner flange plate 14 to the sprocket 12 and that has a spline engagement part 17 engaged with the intermediate member 30 at its inner periphery. A stepped part 13c exactly facing the outer peripheral edge of the flange 24 on the inner-cylinder-part 20 side is disposed between a large-diameter concave part 13a on the opening side of the concave part 13 of the outer cylinder part 10 and a small-diameter concave part 13b on the deep side of the concave part 13. Since the sprocket 12, the inner flange plate 14, and the spline case 16 are united together by a fastening screw 11, the flange engagement groove 13A and the spline engagement part 17 of the spline case 16 can be easily formed.

A small-diameter sprocket 12A is fastened to the outer cylinder part 10. This sprocket 12A is connected to a sprocket (not shown) of the phase varying apparatus for opening and closing the other one of the intake and exhaust valves by means of a chain, and is used to controllably open and close both of the intake valve and the exhaust valve.

Female and male helical splines 32 and 33 are disposed on inner and outer peripheral surfaces, respectively, of the intermediate member 30. A male helical spline 23 is disposed on the outer peripheral surface of the inner cylinder part 20, and a female helical spline is formed at the spline engagement part 17 of the inner peripheral surface of the spline case 16. The helical splines 32 and 33 inside and outside the intermediate member 30 are opposite in direction to each other, and hence a slight movement in the axial direction of the intermediate member 30 makes it possible to greatly vary the phase of the inner cylinder part 20 with respect to the outer cylinder part 10. A male screw part 31 is formed on the outer peripheral surface of the intermediate member 30.

The electromagnetic brake 40 has an electromagnet (electromagnetic coil) 62 in a clutch case 60, and is composed of an electromagnetic clutch 42 formed by fastening a friction material 66 to the surface of the clutch case 60, a rotary drum 44 made of a ferromagnetic material to receive a braking force from the friction material 66 of the electromagnetic clutch 42, and a torsion coil spring 46 interposed in the axial direction between the rotary drum 44 and the outer cylinder part 10. The electromagnetic clutch 42 has a pin 68 engaged with a hole formed in the engine case, and is supported by the engine case so as to be movable in the axial direction and so as not to be rotated. The rotary drum 44 is rotatably supported by the inner cylinder part 20 with bearings 22 therebetween, and a female screw part 45 is formed to be screwed to the male screw part 31 of the intermediate member 30. When the rotary drum 44 rotates relative to the outer cylinder part 10, the intermediate member 30 is moved in the axial direction by the operation of the screw parts 45 and 31.

A braking force is not exerted on the rotary drum 44 when the electromagnetic clutch 42 is in an OFF state. Therefore, the rotary drum 44 and the outer cylinder part 10 are fixed to their initial positions by means of the torsion coil spring 46, and the outer cylinder part 10, the inner cylinder part 20, the intermediate member 30, and the rotary drum 44 are rotated together, and hence a phase difference does not occur between the outer cylinder part 10 and the inner cylinder part 20. Therefore, since the inner cylinder part 20 is connected to the camshaft 2, and since the outer cylinder part 10 is connected to a crank pulley disposed on the crankshaft by means of a chain, the intake valve or the exhaust valve can be opened and closed in accordance with the rotation of the crankshaft at a normal timing.

When the electromagnetic clutch 42 is turned on, a braking force generated by friction acts on the friction material 66 of the electromagnetic clutch 42, and acts on the rotary drum 44. When the braking force acts on the rotary drum 44, the rotary drum 44 causes a rotational delay relative to the outer cylinder part 10, and the intermediate member 30 is moved rightwardly in FIG. 12 by the operation of the screw parts 31 and 45. Accordingly, the inner cylinder part 20 is rotated relative to the outer cylinder part 10 by means of the inner and outer helical splines 32 and 33 of the intermediate members 30, and a phase difference therebetween changes. The rotary drum 44 is kept at a position at which a balance is maintained between the braking force and the spring force of the torsion coil spring 46. If an electric current supplied to the electromagnet of the electromagnetic clutch 42 is controlled, the inner cylinder part 20 and the outer cylinder part 10 can be controlled to create a desired phase difference therebetween. As a result, the opening/closing timing of the intake valve or the exhaust valve can be appropriately varied.

When the electromagnetic clutch 42 is again turned off, the braking force stops acting on the rotary drum 44. Therefore, the intermediate member 30 is rotated to its initial position by undergoing the action of the torsion coil spring 46, and is moved to its initial position leftwardly in FIG. 12 by the operation of the screw parts 31 and 45. As a result, the inner cylinder part 20 rotates to its initial position in the opposite direction with respect to the outer cylinder part 10, and a phase difference therebetween disappears, so that the intake valve or the exhaust valve can be opened and closed at a normal timing.

Friction torque adding members 51 and 55 are interposed between the flange 24 of the inner cylinder part 20 and a side surface of the flange engagement groove 13A of the outer cylinder part 10. Therefore, the friction torque of a relative sliding portion between the outer cylinder part 10 and the inner cylinder part 20 is increased, and tooth portions are prevented from emitting a rattling sound caused by the collision of the tooth portions with each other in the helical spline engagement parts 23, 32, 33, and 17 between the intermediate member 30 and the outer and inner cylinder parts 10 and 20.

Engine oil is supplied into the phase varying apparatus through an entrance 73a of the camshaft 2, an oil passage formed in the camshaft 2, and an exit 73b of the camshaft 2. The engine oil that has been discharged from the exit 73b is supplied between sliding surfaces between the friction material 66 disposed on the surface of the electromagnetic clutch 42 and the rotary drum 44, and, as a result, the friction material 66 and the rotary drum 44 can be prevented from being overheated by friction therebetween (for details, see Patent Literature 1 mentioned below).

Patent Literature 1: Japanese Published Unexamined Patent Application No. 2002-371814

DISCLOSURE OF THE INVENTION

Problems to be Solved by the Invention

As described above, in the phase varying apparatus, when the temperature of the relative sliding surface between the friction material 66 and the rotary drum 44 becomes high owing to frictional heat, the surface of the friction material generally made of porous material is clogged with reactants or insoluble residues of additives, such as an anti-oxidizing agent, a friction adjusting agent, and a detergent dispersant, which are dispersed in engine oil. Therefore, there is a possibility that the friction torque generated in the friction material 66 and in the rotary drum 44 will decrease, and hence a cooling mechanism for allowing engine oil to flow between the friction material 66 and the rotary drum 44 becomes indispensable. Therefore, a conventional problem resides in the fact that, to form the cooling mechanism, the phase varying apparatus becomes complex in structure and high in cost.

The present invention has been made in consideration of this problem. It is therefore an object of the present invention to provide a phase varying apparatus for use with a vehicle engine that does not generate heat by friction and that is simple in structure and low in cost.

Means for Solving the Problems

To achieve the object, a phase varying apparatus for use with an engine according to a first aspect of the present invention comprises an outer cylinder part to which the rotation of a crankshaft of the engine is transmitted; an inner cylinder part that is rotatable relative to the outer cylinder part and that is connected to a camshaft used to open and close an intake valve or an exhaust valve of the engine; and an intermediate member interposed between the outer cylinder part and the inner cylinder part, and the phase varying apparatus varies an opening/closing timing of the intake valve or the exhaust valve while creating relative rotations between the outer cylinder part and the inner cylinder part by means of an action of the intermediate member. The phase varying apparatus is characterized by further comprising a rotary drum that drives the intermediate member; an electromagnetic clutch including a plurality of magnets that are fixedly arranged at predetermined intervals along a circumferential direction of the rotary drum and that are magnetized alternately in opposite directions and a coil wound around an iron core; and a magnetic flux induction member that is made of ferromagnetic material and that has a plurality of claws each of which is close to a magnetic pole of the magnet. A slight gap is formed between the iron core and the magnetic flux induction member. A magnetic path is made up of the iron core and the magnets. The magnetic flux induction member is fixed to the outer cylinder part or to the inner cylinder part, and the rotary drum is accelerated and decelerated by a magnetic force exerted on the magnet by means of the claw. The intermediate member is driven while controlling an ON state, an OFF state, and a direction of an electric current to be supplied to the coil.

A phase varying apparatus for use with an engine according to a second aspect of the present invention is characterized in that, in the phase varying apparatus according to the first aspect of the present invention, the iron core is an annular body having a U-shaped cross-section and consisting of an outer wall part, an inner wall part formed coaxially with the outer wall part, and a bottom part through which the outer wall part and the inner wall part are connected together; the coil is wound around the inner wall part; the magnetic flux induction member consists of an outer magnetic flux induction member and an inner magnetic flux induction member; the outer magnetic flux induction member includes an annular outer wall part close to a forward end of the outer wall part and a plurality of claws close to one of the magnetic poles of the magnet; and the inner magnetic flux induction member includes an annular part close to a forward end of the inner wall part and a plurality of claws close to the other one of the magnetic poles of the magnet.

A phase varying apparatus for use with an engine according to a third aspect of the present invention is characterized in that, in the phase varying apparatus according to the first aspect of the present invention, the iron core is an annular body whose opening part faces the magnet; the iron core is located outside the magnet and has a U-shaped cross-section having a pair of sidewall parts and a bottom part through which the sidewall parts are connected together; the magnetic flux induction member consists of a pair of annular magnetic flux induction members a peripheral edge part of each of which is brought close to a forward end of each of the pair of sidewall parts; one of the pair of annular magnetic flux induction members has a plurality of claws coming close to one of the magnetic poles of the magnet; and the other one of the pair of annular magnetic flux induction members has a plurality of claws coming close to the other one of the magnetic poles of the magnet.

A phase varying apparatus for use with an engine according to a fourth aspect of the present invention is characterized in that, in the phase varying apparatus according to the second or third aspect of the present invention, the pairs of magnetic flux induction members are connected together via a non-magnetic spacer.

A phase varying apparatus for use with an engine according to a fifth aspect of the present invention is characterized in that, in the phase varying apparatus according to any one of the first to fourth aspects of the present invention, the electromagnetic clutch is provided with a position sensor that detects a position of the claw that has come closest to the position sensor and a magnetic sensor that detects a magnetic pole of the magnet that has come closest to the magnetic sensor.

A phase varying apparatus for use with an engine according to a sixth aspect of the present invention is characterized in that, in the phase varying apparatus according to any one of the first to fifth aspects of the present invention, a magnitude of an electric current to be supplied to the coil is also controlled.

Effects of the Invention

According to the first aspect of the present invention, unlike a conventional apparatus in which the rotary drum is braked by the friction material of the electromagnetic clutch, the rotary drum is accelerated or decelerated by an electromagnetic force acting between the magnets fixed to the rotary drum and the claws of the magnetic flux induction member magnetized by the electromagnetic clutch, so that the opening/closing timing of the intake valve or the exhaust valve is varied. Therefore, a high temperature is not generated by frictional heat caused by contact between the friction material of the electromagnetic clutch and the rotary drum. Therefore, disadvantages are not caused by the deterioration of engine oil, and a torsion coil spring that returns the friction material and the rotary drum to their initial positions or a cooling mechanism for cooling the electromagnetic clutch and the rotary drum is not required to be provided. Therefore, the apparatus of the present invention can achieve a simple structure, can have a long life without easily breaking down, and can be produced at low cost. Additionally, since the magnetic flux induction member is fixed to the outer cylinder part side or to the inner cylinder part side, each magnet does not make a high-speed movement relative to each claw, and hence a phase control operation can be performed with ease and with high accuracy. Additionally, the rate of change of the magnetic flux that enters the iron core from each magnet through the claws and the magnetic flux induction member is small, and a great counter-electromotive force is not generated in the coil wound around the iron core. Therefore, the coil can be excited by a low voltage, and high practicality can be achieved.

According to the second aspect of the present invention, the magnetic flux induction member consists of the outer magnetic flux induction member and the inner magnetic flux induction member, and the outer magnetic flux induction member includes an annular outer wall part close to a forward end of the outer wall part of the iron core and a plurality of claws close to one of the magnetic poles of the magnet, whereas the inner magnetic flux induction member includes an annular part close to a forward end of the inner wall part of the iron core and a plurality of claws close to the other one of the magnetic poles of the magnet. Therefore, a magnetic path from which a magnetic flux is hardly leaked can be made up of the magnets, the inner magnetic flux induction member, the iron core, and the outer magnetic flux induction member. As a result, the claws of the outer magnetic flux induction member and the claws of the inner magnetic flux induction member can be greatly magnetized, and a great magnetic force can be exerted on two poles of each magnet. Therefore, a phase varying control operation can be performed at high speed and with high accuracy in spite of the fact that the phase varying apparatus is light in weight and small in size. Moreover, in the electromagnetic clutch, the iron core is an annular body having a U-shaped cross-section and consisting of the outer wall part, the inner wall part formed coaxially with the outer wall part, and the bottom part through which the outer wall part and the inner wall part are connected together, and the coil is wound around the inner wall part. Therefore, economically advantageously, the conventional electromagnetic clutch can be used without being modified.

According to the third aspect of the present invention, the magnetic flux induction member consists of a pair of annular magnetic flux induction members a peripheral edge part of each of which is brought close to a forward end of each of the pair of sidewall parts of the iron core, and one of the pair of annular magnetic flux induction members has a plurality of claws coming close to one of the magnetic poles of the magnet, whereas the other one of the pair of annular magnetic flux induction members has a plurality of claws coming close to the other one of the magnetic poles of the magnet. Therefore, a magnetic path from which a magnetic flux is hardly leaked can be made up of the magnets, the pair of magnetic flux induction members, and the iron core, and the same effect as in the second aspect of the present invention is fulfilled. Additionally, the iron core is located outside the magnet, and has a U-shaped cross-section having a pair of sidewall parts and a bottom part through which the sidewall parts are connected together, and is an annular body whose opening part faces the magnet. Therefore, the length in the axial direction of the phase varying apparatus can be shortened.

According to the fourth aspect of the present invention, the pairs of magnetic flux induction members are connected together via a non-magnetic spacer. Therefore, the magnetic path is never short-circuited between the pair of magnetic flux induction members. As a result, each claw of the pair of magnetic flux induction members can be magnetized more greatly, and an even greater magnetic force is exerted on each magnet. Therefore, a phase varying control operation can be performed at higher speed and with higher accuracy in spite of the fact that the phase varying apparatus is light in weight and small in size.

According to the fifth aspect of the present invention, the electromagnetic clutch is provided with a position sensor that detects a position of the claw that has come closest to the position sensor and a magnetic sensor that detects a magnetic pole of the magnet that has come closest to the magnetic sensor. Therefore, the positional relationship between all claws and the polarities of all magnets is understood. As a result, a magnetic force is exerted on the magnet by appropriately magnetizing each claw, and the rotary drum is accelerated and decelerated, so that a phase varying control operation can be freely performed.

According to the sixth aspect of the present invention, a magnitude of an electric current to be supplied to the coil is also controlled. Therefore, a phase control operation can be performed with higher accuracy and with quicker responsivity.

EMBODIMENTS OF THE INVENTION

Embodiments of the present invention will be described in detail with reference to the attached drawings. First, a phase varying apparatus according to a first embodiment of the present invention will be described with reference to FIG. 1 to FIG. 6. FIG. 1 is a longitudinal sectional view of the phase varying apparatus. FIG. 2 is a perspective view of magnetic flux induction members of the phase varying apparatus. FIG. 3 is an explanatory drawing for explaining a principle according to which a rotary drum of the phase varying apparatus is accelerated and decelerated. FIG. 4 is a block diagram of a control circuit that controls an electric current flowing to a coil of an electromagnetic clutch of the phase varying apparatus. FIG. 5 is a wiring diagram of a coil drive circuit of the phase varying apparatus. FIG. 6 is a flowchart for explaining a process for controllably accelerating and decelerating the rotary drum.

As shown in FIG. 1, the phase varying apparatus of the present invention has the same structure as the conventional phase varying apparatus mentioned above, except that the phase varying apparatus of the present invention is provided with an electromagnetic control means 40a, which consists of a rotary drum 44A and an electromagnetic clutch 42, and a control circuit of the electromagnetic control means 40a. Therefore, in this embodiment, a description of the same elements as in the conventional phase varying apparatus is omitted as properly as possible, and only elements differing from those of the conventional phase varying apparatus and parts especially required to be described will be described hereinafter.

As shown in FIG. 1, the electromagnetic clutch 42 of the phase varying apparatus is composed of a sectionally U-shaped, ring-like iron core, which consists of an outer wall part 60A, an inner wall part 60B disposed coaxially with the outer wall part 60A, a bottom part 60C through which the outer wall part 60A and the inner wall part 60B are connected together, and a coil 62 wound around the inner wall part 60B. The iron core is made of ferromagnetic material, and is used also as a clutch case 60. When the coil 62 is energized, the forward end of the outer wall part 60A and the forward end of the inner wall part 60B are magnetized to have mutually different magnetic poles N and S, respectively. When the direction in which an electric current is passed through the coil 62 is reversed, the magnetic pole of the forward end of the outer wall part 60A and that of the forward end of the inner wall part 60B are reversed.

The rotary drum 44A is rotatably supported by the inner cylinder part 20 with bearings 22 therebetween, and is screwed to a male screw part 31 of an intermediate member 30 by means of a female screw part 45. The rotary drum 44A has a cylindrical shape having no part facing the electromagnetic clutch 42, and has its outer peripheral surface to which eighteen magnets 80 are fixed at equal intervals along the circumferential direction. In this instance, each magnet 80 is fastened into a fixing hole of a magnet fixing plate 81A fixed to the rotary drum 44A by means of a washer 81B and a nut 81C. Additionally, as shown in FIG. 2, each magnet 80 is magnetized in the axial direction of the rotary drum 44, and has a magnetized direction opposite to that of the adjoining magnet.

A spline case 16 serving as a part of the outer cylinder part 10 is engaged with a male helical spline 33 of the outer peripheral surface of the intermediate member 30 at a spline engagement part 17, and fixes an outer magnetic flux induction member 82 and an inner magnetic flux induction member 84. The outer magnetic flux induction member 82 and the inner magnetic flux induction member 84 are both made of ferromagnetic material, and are fixed to the spline case 16 by means of bolts 88A and 88B, respectively, with a non-magnetic spacer 86 between the outer and inner magnetic flux induction members 82 and 84.

As shown in FIG. 2, the outer magnetic flux induction member 82 consists of a basal part 82A being in contact with the spline case 16, claws 82B each of which extends from the inner peripheral edge of the basal part 82A to one of the magnetic poles of the magnet 80, and an annular outer wall part 82C that extends from the outer peripheral edge of the basal part 82A to the forward end of the outer wall part 60A of the clutch case 60 of the electromagnetic clutch 42. An extremely small gap d is formed between the outer wall parts 60A and 82C. The spacer 86 and the basal part 82A are connected to the spline case 16 by means of a connecting piece such as a bolt 88A.

The inner magnetic flux induction member 84 consists of an annular part 84A that is brought close to the forward end of the inner wall part 60B of the clutch case 60 with an extremely small gap d therebetween, claws 84B each of which extends from the annular part 84A to the other one of the magnetic poles of the magnet 80, and a connection part 84C connected to the spacer 86. The spacer 86 and the connection part 84C are connected together by means of a connecting piece such as a bolt 88B. The claws 82B of the outer magnetic flux induction member 82 and the claws 84B of the inner magnetic flux induction member 84 are evenly spaced out at positions at which the claws 82B face the claws 84B, respectively, and the number of these claws is twelve. These claws are brought extremely close to the magnetic poles 80A and 80B.

The reason why the non-magnetic spacer 86 is interposed between the outer magnetic flux induction member 82 and the inner magnetic flux induction member 84 and the reason why the outer magnetic flux induction member 82 and the inner magnetic flux induction member 84 are not fixed to the spline case 16 by means of a single bolt are that a magnetic path 85 made up of the magnets 80, the inner magnetic flux induction member 84, the clutch case 60, and the outer magnetic flux induction member 82 is prevented from being short-circuited by the bolt. Therefore, the magnetic path 85 made up of the magnets 80, the inner magnetic flux induction member 84, the clutch case 60, and the outer magnetic flux induction member 82 has less magnetic flux leakage, and the claws 82B of the outer magnetic flux induction member 82 and the claws 84B of the inner magnetic flux induction member 84 can be greatly magnetized.

The claws 82B and 84B of the outer and inner magnetic flux induction members 82 and 84 can exert a magnetic force on the magnets 80 by energizing the coil 62 of the electromagnetic clutch 42 and by magnetizing the claws 82B and 84B, and, as a result, the rotary drum 44A can be accelerated and decelerated with respect to the magnetic flux induction members 82 and 84. Therefore, since the female screw part 45 of the rotary drum 44A is screwed to the male screw part 31 of the intermediate member 30, the intermediate member 30 moves in the axial direction, and, as a result, the phase between the inner cylinder part 20 and the outer cylinder part 10 having a spline connection with the intermediate member 30 can be varied.

Unlike the conventional apparatus shown in FIG. 12, the electromagnetic control means 40a does not include a torsion coil spring that moves the rotary drum 44A to its initial position and a friction material being in sliding contact with the rotary drum 44A.

A principle according to which the rotary drum 44A is accelerated and decelerated will be described with reference to FIG. 3. Note that, in FIG. 3, the rotary drum 44A and the magnetic flux induction members are planarly expanded at positions of the magnets 80 and the claws 82B and 84B in order to provide an easily understandable description of the positional relationship between the magnets 80 fixed to the rotary drum 44A and the claws 82B and 84B of the magnetic flux induction members 82 and 84. Herein, the rotational direction of the rotary drum 44A is assumed as a rightward direction, and this rightward direction is assumed as showing a front side, whereas a leftward direction opposite thereto is assumed as showing a rear side.

To detect either of the magnetic poles of the magnet 80 that faces the claw 82B of the outer magnetic flux induction member 82 or the claw 84B of the inner magnetic flux induction member 84 and to which the claw 82B or the claw 84B has come closest, the electromagnetic clutch 42 has a magnetic sensor 90 placed next to either the claw 82B of the outer magnetic flux induction member 82 or the claw 84B of the inner magnetic flux induction member 84. The electromagnetic clutch 42 additionally has a position sensor 91 that detects the approach of the claw 82B or 84B that has come nearest thereto.

For example, a sensor, which outputs an H signal (+1) when one magnetic pole N (or S) approaches and which outputs an L signal (0) when the other magnetic pole S (or N) approaches, is used as the magnetic sensor 90. A hall element is used as the thus designed magnetic sensor 90. Of course, a magnetic sensor, such as a search coil, can be appropriately used. A position sensor, such as a photosensor or a proximity sensor, can be appropriately used as the position sensor 91.

First, an instance in which the rotary drum 44A is accelerated will be described. As shown in FIG. 3A, at time T1, the time when the claws 82B and 84B of the magnetic flux induction members 82 and 84 that have come closest to the position sensor 91 are located at predetermined positions is detected by a positional signal emitted from the position sensor 91. At the same time, based on a magnetic signal emitted from the magnetic sensor 90, it is understood whether the magnetic pole of the magnet 80 nearest to the magnetic sensor 90 is N or S. From this, the positional relationship between the polarities of all magnets 80 and all claws 82B and 84B is understood because the magnets 80 and the claws 82B and 84B are evenly spaced out. At this time, to accelerate the rotary drum 44A, the coil 62 is energized so that each claw 82B disposed on the side on which the magnetic sensor 90 is disposed has the same magnetic pole as a magnetic pole detected by the magnetic sensor 90 and so that each claw 84B disposed on the opposite side has a magnetic pole opposite to the magnetic pole detected by the magnetic sensor 90.

At time T2 subsequent to this, the time when the claws 82B and 84B that have come closest to the position sensor 91 are located at predetermined positions is detected. As shown in FIG. 3B, at this time, the magnets 80 move relative to the claws 82B and 84B, so that the rotary drum 44A is neither accelerated nor decelerated, and the magnetic signal emitted from the magnetic sensor 90 is reversed.

At time T3 subsequent to this, the time when the claws 82B and 84B that have come closest to the position sensor 91 are located at predetermined positions is detected. As shown in FIG. 3C, at this time, the magnets 80 move relative to the claws 82B and 84B. Herein, to keep accelerating the rotary drum 44A, from time T2, the polarity of an electric current supplied to the coil 62 is reversed so that each claw 82B disposed on the side on which the magnetic sensor 90 is disposed is magnetized to be the same magnetic pole as a magnetic pole detected by the magnetic sensor 90 and so that each claw 84B on the opposite side is magnetized to be a magnetic pole opposite to a magnetic pole detected by the magnetic sensor 90.

At time T4 subsequent to this, the time when the claws 82B and 84B that have come closest to the position sensor 91 are located at predetermined positions is detected. At this time, the magnets 80 move relative to the claws 82B and 84B to the positions shown in FIG. 3D, so that the rotary drum 44A is neither accelerated nor decelerated, and the magnetic signal emitted from the magnetic sensor 90 is again reversed. Here, the rotary drum 44A can continue to be accelerated by reversing the polarity of an electric current supplied to the coil 62.

In the same way in the following steps, whenever the polarity determined by a magnetic signal emitted from the magnetic sensor 90 is reversed, the direction of an electric current applied to the coil 62 is reversed so that each claw 82B disposed on the side on which the magnetic sensor 90 is disposed is magnetized to be the same magnetic pole as a magnetic pole detected by the magnetic sensor 90 and so that each claw 84B on the opposite side is magnetized to be a magnetic pole opposite to a magnetic pole detected by the magnetic sensor 90. As a result, the rotary drum 44A can continue to be accelerated.

When there is no need to accelerate and decelerate the rotary drum 44A, the supply of an electric current to the coil 62 is stopped. Accordingly, the rotary drum 44A continues rotating at a constant speed. When there is a need to decelerate the rotary drum 44A, an electric current opposite in direction to an electric current applied when the rotary drum 44A is accelerated is merely passed through the coil 62.

As shown in FIG. 4, the control circuit 100 that controls an electric current to be passed through the coil 62 of the electromagnetic clutch 42 is composed of a controller (microcomputer) 102, a coil drive circuit 104, a variable voltage power source 106, the magnetic sensor 90, and the position sensor 91.

Based on a crank angle signal "a" and a cam angle signal "b" that are sent from an engine 110, a magnetic signal "c" that is sent from the magnetic sensor 90, and a positional signal "c'" that is sent from the position sensor 91, the controller 102 sends a driving signal "d," according to which the rotary drum 44A is controllably accelerated or decelerated, to the coil drive circuit 104 so that a deviation from the set value of the phase angle of a cam angle relative to a crank angle disappears, i.e., so that a phase excursion disappears. What is required to stop the acceleration and deceleration of the rotary drum 44A is to stop the driving signal "d." Additionally, according to the absolute value of a phase excursion, the controller 102 sends a power source control signal "e," according to which a voltage to be applied to the coil 62 is changed, to the variable voltage power source 106 so that a phase control operation can be performed in a finer manner.

The coil drive circuit 104 is a semiconductor switching circuit that brings an electric current supplied to the coil 62 into an ON or OFF state and that changes the direction of the electric current in accordance with a driving signal "d" sent from the controller 102. The driving signal "d" includes an H1 signal and an H2 signal that are used to turn a switching transistor of the coil drive circuit 104 on and off. An H (high potential) signal or L (low potential) signal is emitted as the H1 signal and the H2 signal.

The variable voltage power source 106 raises or lowers an output voltage in accordance with a power source control signal "e" sent from the controller 102, and then supplies the resulting voltage to the coil drive circuit 104. In this embodiment, if the absolute value of a phase excursion is small, pulse-width modulation (PWM) is executed in accordance with a power source control signal "e," and the output voltage is lowered. On the other hand, if the absolute value of a phase excursion is great, the output voltage of the variable voltage power source 106 is appropriately raised by a voltage raising means in order to pass a sufficient electric current through the coil 62.

FIG. 5 shows an example of a wiring diagram of the coil drive circuit 104. The coil drive circuit 104 is a bridge circuit consisting of four switching transistors 92 and one coil 62. A diode 94 inserted in the switching transistor 92 in parallel therewith is used to prevent a counter-electromotive force generated in the coil 62 from being applied onto the switching transistor 92.

An H1 signal and an H2 signal serving as driving signals "d" to turn the switching transistor 92 on and off are sent from the controller 102. If the H1 signal is an H signal (H1=1) and if the H2 signal is an L signal (H2=0), an electric current is rightwardly passed through the coil 92, and hence the claws 82B and 84B can be magnetized. On the other hand, if the H1 signal is an L signal (H1=0) and if the H2 signal is an H signal (H2=1), an electric current is leftwardly passed through the coil 62, and hence the magnetization of the claws 82B and 84B can be reversed. The H1 signal or the H2 signal is sent from the controller 102 to the coil drive circuit 104 in this way, and the direction of an electric current to be supplied to the coil 62 is controlled, so that the claws 82B and 84B have proper magnetic poles, respectively. As a result, the rotary drum 44A can be freely accelerated or decelerated.

Referring to FIG. 6, a description will be given of a control process performed by the controller 102 of the phase varying apparatus in order to controllably accelerate and decelerate the rotary drum 44A. When the phase varying apparatus starts operating, the process first proceeds to step S1, at which, based on a crank angle signal "a" and a cam angle signal "b" sent from the engine 110, it is judged whether the absolute value of a deviation from the set value of a phase angle of a cam angle relative to a crank angle, i.e., the absolute value of a phase excursion exceeds a predetermined value K1. If the absolute value of the phase excursion is less than the predetermined value K1, there is no need to controllably accelerate and decelerate the rotary drum 44A, and hence the process proceeds to step S2, at which the driving signal "d" stops being sent to the coil drive circuit 104 (H1=0, H2=0) so as to stop the supply of an electric current to the coil 62 and so as to bring the claws 82B and 84B into a non-excitation state. The process then returns to step S1.

If the absolute value of the phase excursion exceeds the predetermined value K1 at step S1, there is a need to controllably accelerate and decelerate the rotary drum 44A, and hence the process proceeds to step S3, at which it is judged whether to accelerate or decelerate the rotary drum 44A from the fact that the phase excursion is positive or negative. For example, if the phase excursion is negative, it is determined that the rotary drum 44A is decelerated, and steps S4 to S6 are performed. However, depending on the direction of the inner and outer helical splines 32 and 33 (see FIG. 12) of the intermediate member 30, the rotary drum 44A is accelerated without being decelerated.

The process then proceeds to step S4, at which a magnetic signal "c" sent from the magnetic sensor 90 is examined, and it is determined whether the magnetic pole of the magnet 80 that has come nearest to the magnetic sensor 90 is N or S, and then the determination is made of the direction in which an electric current is passed through the coil 62 and of the driving signal (H1 signal and H2 signal) "d" to energize the coil 62.

Thereafter, the process proceeds to step S5, at which a power source control signal "e" is determined from the absolute value of the phase excursion. If the absolute value of the phase excursion exceeds a predetermined value K2 (K2>K1), the variable voltage power source 106 raises the output voltage so as to be greater than the voltage of the power source (battery) in accordance with the absolute value of the phase excursion. On the other hand, if the absolute value of the phase excursion is less than the predetermined value K2, the variable voltage power source 106 lowers the output voltage so as to be smaller than the voltage of the power source in accordance with the absolute value of the phase excursion.

Thereafter, the process proceeds to step S6, at which a power source control signal "e" is sent to the variable voltage power source 106, and a driving signal "d" is sent to the coil drive circuit 104, so that an electric current is passed through the coil 62 of the electromagnetic clutch 42. Thereafter, the process returns to step S1. Step S1 and steps S3 to S6 are repeatedly performed in this way. The rotary drum 44A is decelerated, and the phase excursion is reduced until the absolute value of the phase excursion falls within the predetermined value K1.

Steps S7 to S9 are performed if it is determined that the phase excursion is positive and that the rotary drum 44A is accelerated at step S3. Although the driving signal "d" is determined in the same way as at S4 mentioned above at step S7, the H1 signal and the H2 signal that are the constituents of the driving signal "d" are reversed, unlike step S4, in order to accelerate the rotary drum 44A. Steps S8 and S9 are the same as steps S5 and S6 mentioned above. After all, if steps S7 to S9 are performed, the direction in which an electric current is passed through the coil 62 becomes opposite to the direction shown when steps S4 to S6 are performed. Thereafter, the process returns to step S1, and then steps S1, S3, S7, S8, and S9 are repeatedly performed, at which the rotary drum 44A is accelerated, and the phase excursion is reduced until the absolute value of the phase excursion falls within the predetermined value K1.

As described above, steps S1 to S9 are performed, thus making it possible to always keep the phase excursion within the predetermined value K1 in the phase varying apparatus.

According to this embodiment, since the electromagnetic clutch 42 magnetizes the claws 82B and 84B that have come close to the magnetic pole of each magnet 80 via the outer magnetic flux induction member 82 and the inner magnetic flux induction member 84, a great magnetic force is exerted on each magnet, and, since the rotary drum 44A can be accelerated and decelerated, a phase control operation can be performed in the same way as in the conventional apparatus shown in FIG. 12. Additionally, unlike the conventional apparatus, the apparatus of the present invention does not generate heat caused by friction between the friction material 66 disposed on the surface of the electromagnetic clutch 42 and the rotary drum 44A. Therefore, the surface of the friction material can be prevented from being clogged with reactants or insoluble residues of additives, such as an anti-oxidizing agent, a friction adjusting agent, and a detergent dispersant, which are dispersed in engine oil, and the friction torque generated in the friction material 66 and in the rotary drum 44 can be prevented from being lowered, and hence the reliability of the phase varying apparatus is improved. Additionally, since the phase varying apparatus of the present invention does not generate heat, there is no need to provide a cooling mechanism for pouring engine oil between the friction material 66 and the rotary drum 44A. Therefore, the number of constituents can be reduced. Therefore, the phase varying apparatus of the present invention can have a simple structure, can have a long life without easily breaking down, and can be produced at low cost.

Especially in this embodiment, the outer magnetic flux induction member 82 and the inner magnetic flux induction member 84 are fixed to the spline case 16 that is a constituent of an outer cylinder body 10, and hence the claws 82B, 84B and the magnets 80 do not make a high-speed relative movement. This makes it possible to perform an easy, highly-accurate phase control operation. In addition to this, the rate of change of the magnetic flux that enters a clutch cover 60 and the magnetic flux induction members 82 and 84 from the claws 82B and 84B is small, and a great counter-electromotive force is not generated in the coil 62 wound around the inner wall part 60B of the clutch cover 60. Therefore, a low voltage makes it possible to excite the coil 62 and to control the phase, thus achieving high practicality. Moreover, economically advantageously, the conventional electromagnetic clutch 42 can be used without being modified.

Next, a second embodiment of the present invention will be described with reference to FIG. 7. In this embodiment, the inner magnetic flux induction member 84 is connected to the inner cylinder body 20, whereas the outer magnetic flux induction member 82 is not connected to the outer cylinder body 10. Except for this, the second embodiment is substantially the same as the first embodiment although the magnetic flux induction members 82, 84 and the spacer 86 slightly differ in shape from those of the first embodiment. Also in effect, this embodiment is substantially the same as the first embodiment.

Next, a third embodiment of the present invention will be described with reference to FIG. 8. In this embodiment, the magnet 80 is magnetized in the radial direction of the rotary drum 44A, and the rotary drum 44A is provided with a magnet mounting part 44D extending in the radial direction. Except for this, the third embodiment is substantially the same as the first embodiment although the rotary drum 44A, the magnetic flux induction members 82 and 84, and the spacer 86 slightly differ in shape and arrangement from those of the first embodiment. Also in effect, this embodiment is substantially the same as the first embodiment.

Next, a fourth embodiment of the present invention will be described with reference to FIG. 9. Unlike the third embodiment, in this embodiment, the inner magnetic flux induction member 84 is connected to the inner cylinder body 20, whereas the outer magnetic flux induction member 82 is not connected to the outer cylinder body 10. Except for this, the fourth embodiment is substantially the same as the third embodiment although the rotary drum 44A, the magnetic flux induction members 82 and 84, and the spacer 86 slightly differ in shape and arrangement from those of the third embodiment. Also in effect, this embodiment is substantially the same as the first embodiment.

Next, a fifth embodiment of the present invention will be described with reference to FIG. 10. In this embodiment, the electromagnetic clutch 42 and the magnet 80 are disposed in the radial direction of the rotary drum 44A. Additionally, an iron core 60T of the electromagnetic clutch 42 is located outside the magnet 80. This iron core 60T has a U-shaped cross-section having a pair of sidewall parts 60S and a bottom part 60U through which the sidewalls 60S are connected together, and is an annular body whose opening part 60V faces the inner magnet 80. A pair of annular magnetic flux induction members 83 a peripheral edge part of each of which is brought close to the forward end of each of the pair of sidewall parts 60S of the iron core 60 are disposed. One of the annular magnetic flux induction members 83 has a plurality of claws 83B brought close to one of the magnetic poles of the magnet 80, whereas the other one of the annular magnetic flux induction members 83 has a plurality of claws 83B brought close to the other one of the magnetic poles of the magnet 80. The pair of annular magnetic flux induction members 83 have a spacer 86 interposed therebetween, and have a spacer 86 interposed between the outer cylinder body 10 and the annular magnetic flux induction member 83, and are fixed to the outer cylinder body 10 by means of a connecting piece (not shown). Except for this, the fifth embodiment is substantially the same as the first embodiment. According to the fifth embodiment, the electromagnetic clutch 42 and the magnet 80 are disposed in the radial direction, and hence the length in the axial direction of the phase varying apparatus can be shortened. Of course, the pair of annular magnetic flux induction members 83 can also be fixed to the inner cylinder body 20. Also in effect, this embodiment is substantially the same as the first embodiment.

The present invention is not limited to the above-mentioned embodiments. For example, the present invention can be variously modified as follows. In the above-mentioned embodiments, the intermediate member 30 is moved in the axial direction, and the outer cylinder part and the inner cylinder part 20 that are fixed to the intermediate member 30 in a spline manner are rotated relative to each other. However, a structure may be employed in which an intermediate member is appropriately interposed between the outer cylinder part 10 and the inner cylinder part 20, and is appropriately driven by accelerating and decelerating the rotary drum 44 so as to make a relative rotation between the outer cylinder part 10 and the inner cylinder part 20. Additionally, there is no need to equalize the number of the magnets 80 fixed to the rotary drum 44A and the number of the claws 82B and 84B of the magnetic flux induction members 82 and 84 with those employed in the above-mentioned embodiments, and these numbers may be appropriately increased or decreased in accordance with necessary accuracy, necessary torque, or necessary cost. Additionally, in the above-mentioned embodiments, the two magnetic flux induction members 82, 84 and the pair of magnetic flux induction members 83 are provided. However, only the outer magnetic flux induction member 82 may be provided as shown in FIG. 11.

Additionally, in the above-mentioned embodiments, the output voltage of the variable voltage power source 106 is controlled in accordance with the phase excursion. However, as long as highly accurate, fast responsiveness is not required in particular, a practical problem does not occur even if the voltage of the power source is not controlled. Additionally, in the above-mentioned embodiments, two sensors, i.e., the position sensor 91 and the magnetic sensor 90 are provided. However, if the magnetic sensor 90 is disposed on the magnetic flux induction members 82, 84, and 83, the position sensor 91 is not required to be provided. However, since the magnetic flux induction members 82, 84, and 83 are rotated, there is a need to connect the magnetic sensor 90 and the controller 102 disposed at a non-rotational part together by means of a suitable connecting means such as a slip ring.

DESCRIPTION OF SYMBOLS

Figure 1:
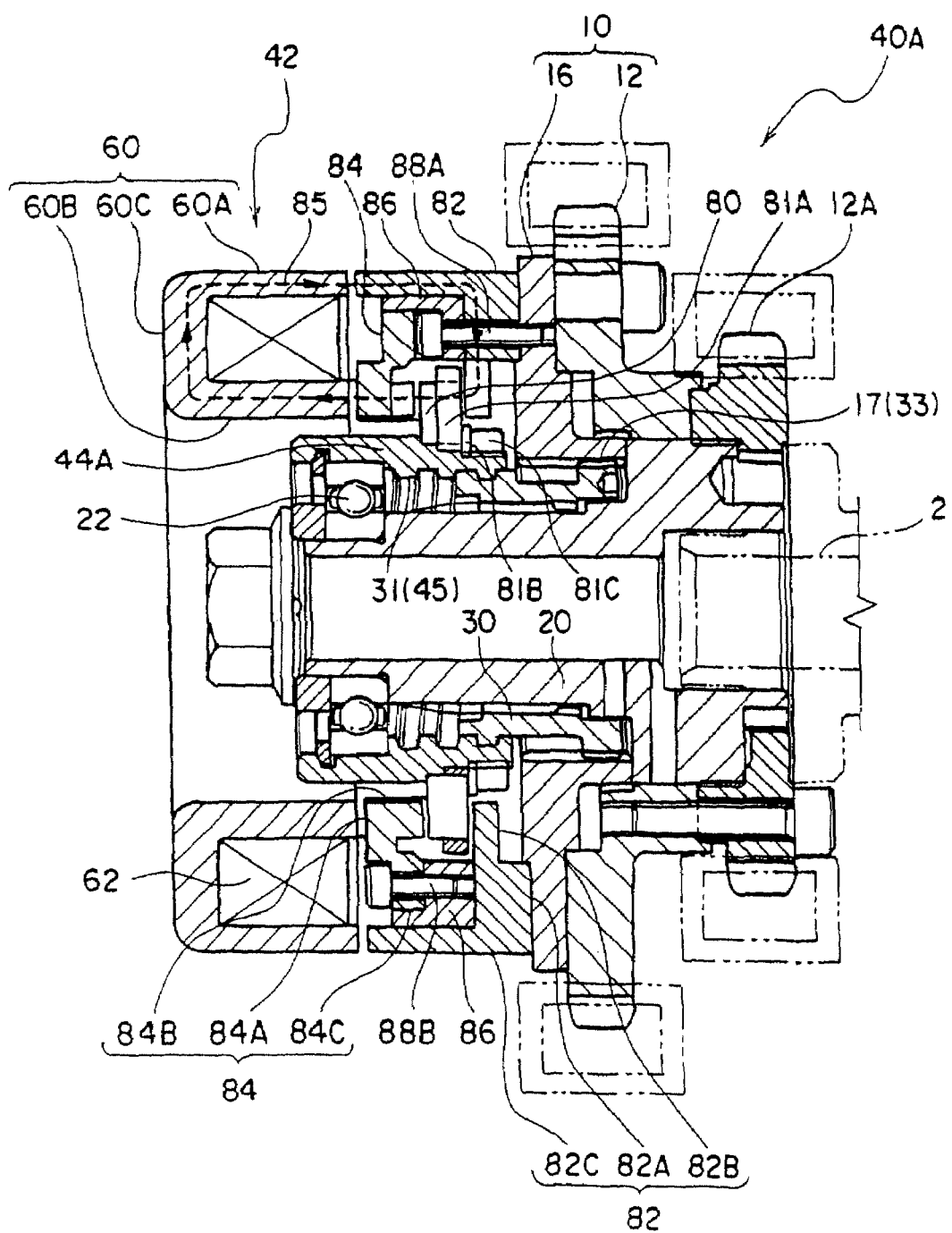
FIG. 1 is a longitudinal sectional view of a phase varying apparatus according to an embodiment of the present invention.
Figure 2:
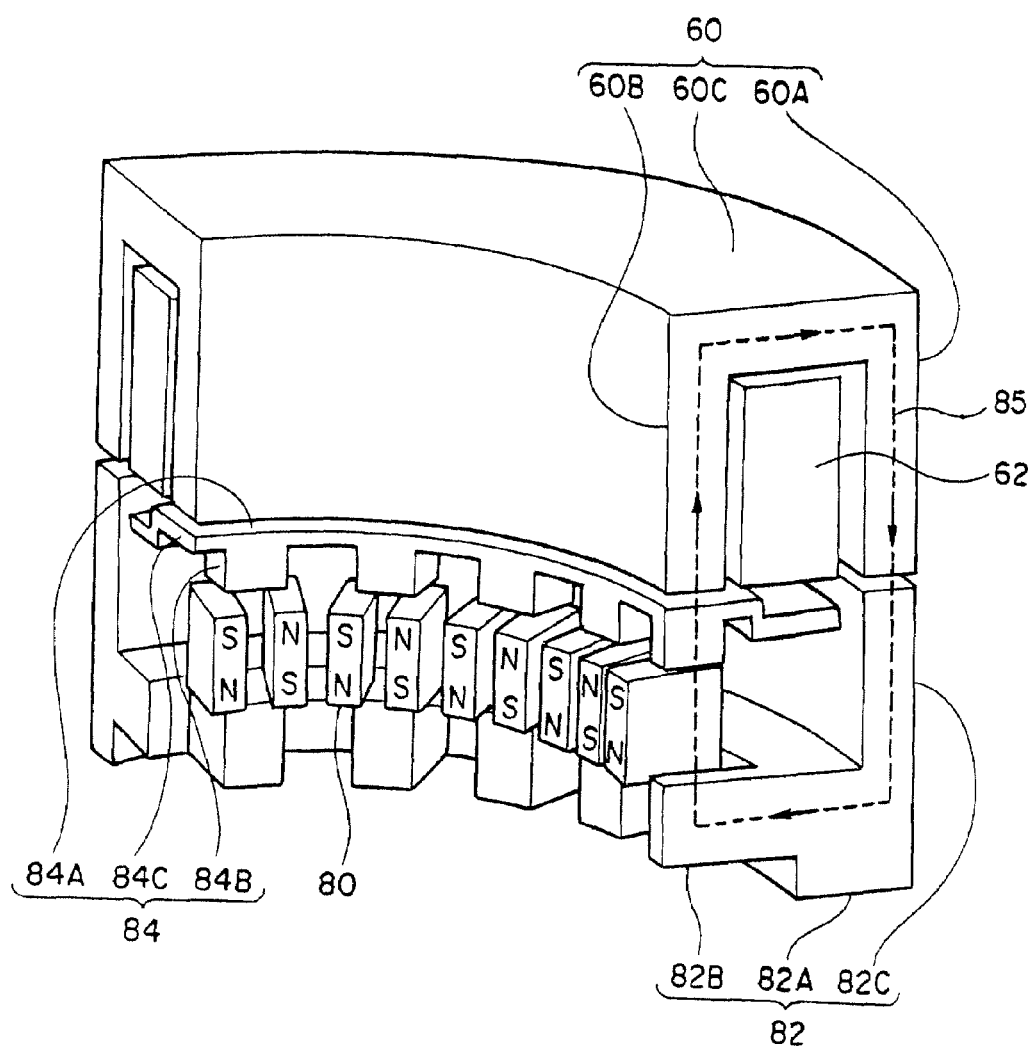
FIG. 2 is a perspective view of magnetic flux induction members of the phase varying apparatus.
Figure 3:
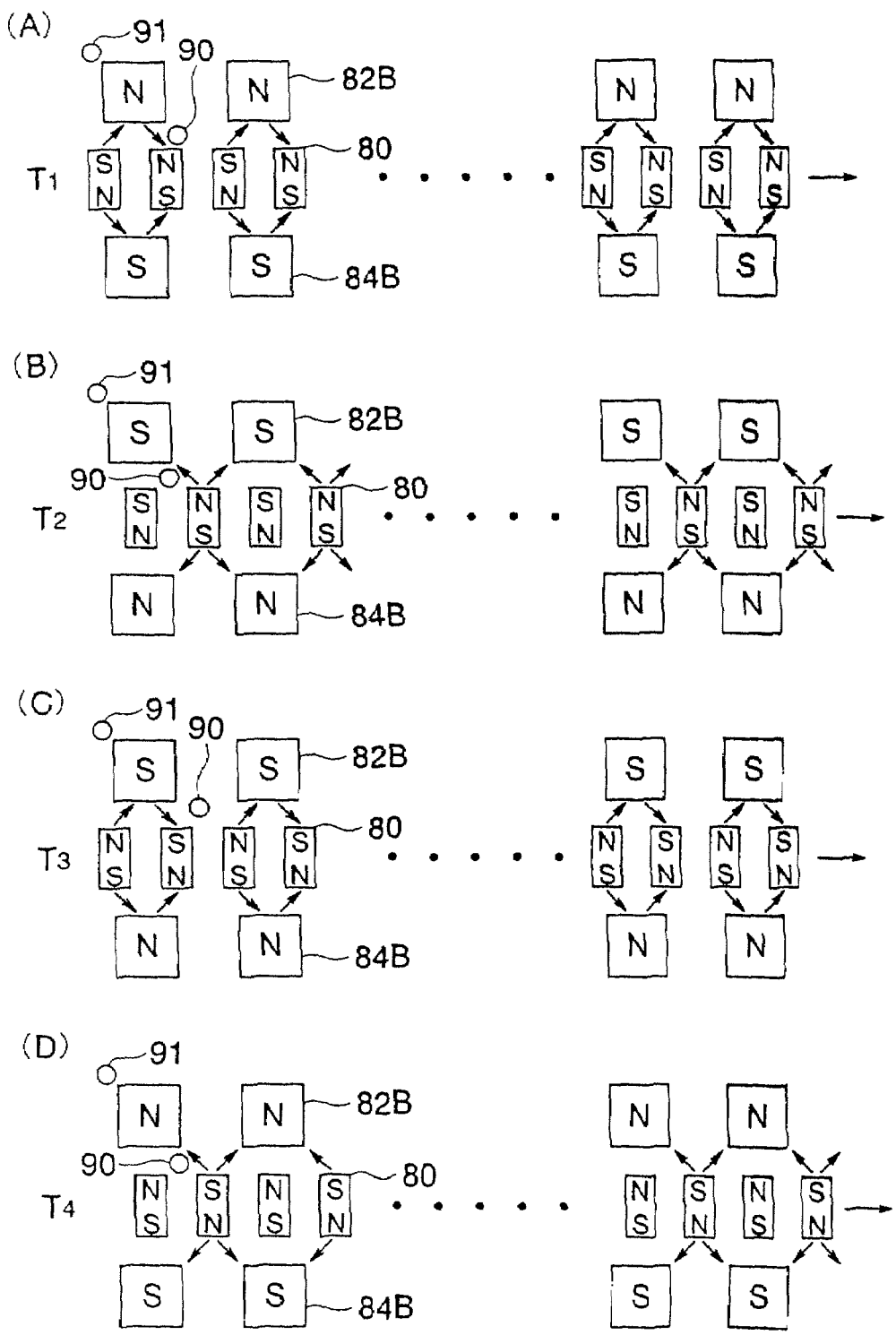
FIG. 3 is an explanatory drawing for explaining a principle according to which a rotary drum of the phase varying apparatus is accelerated and decelerated.
Figure 4:
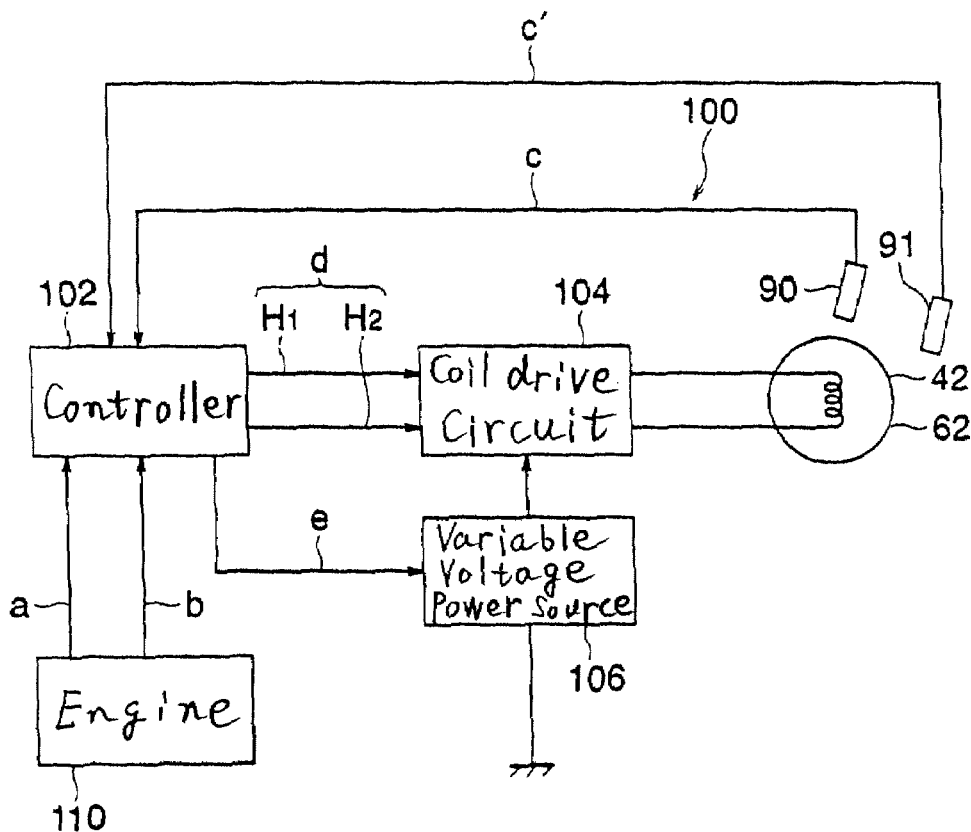
FIG. 4 is a block diagram of a control circuit of an electromagnetic clutch of the phase varying apparatus.
Figure 5:
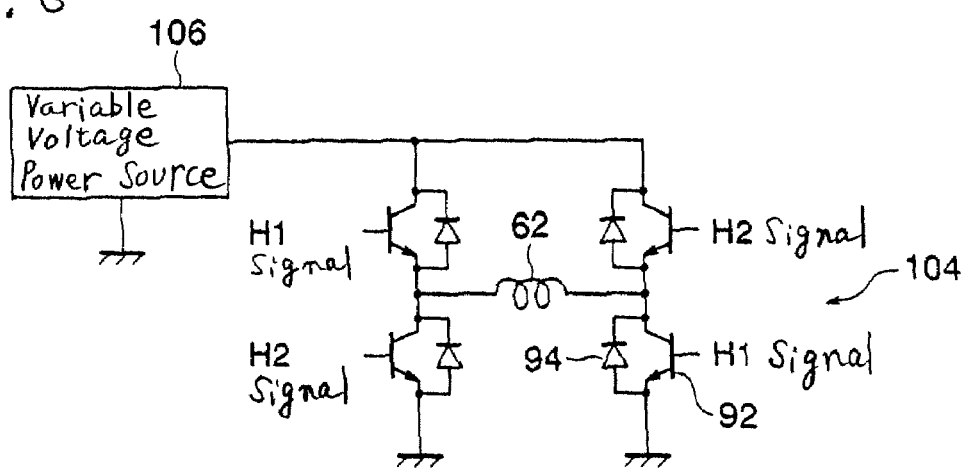
FIG. 5 is a wiring diagram of a coil drive circuit of the phase varying apparatus.
Figure 6:
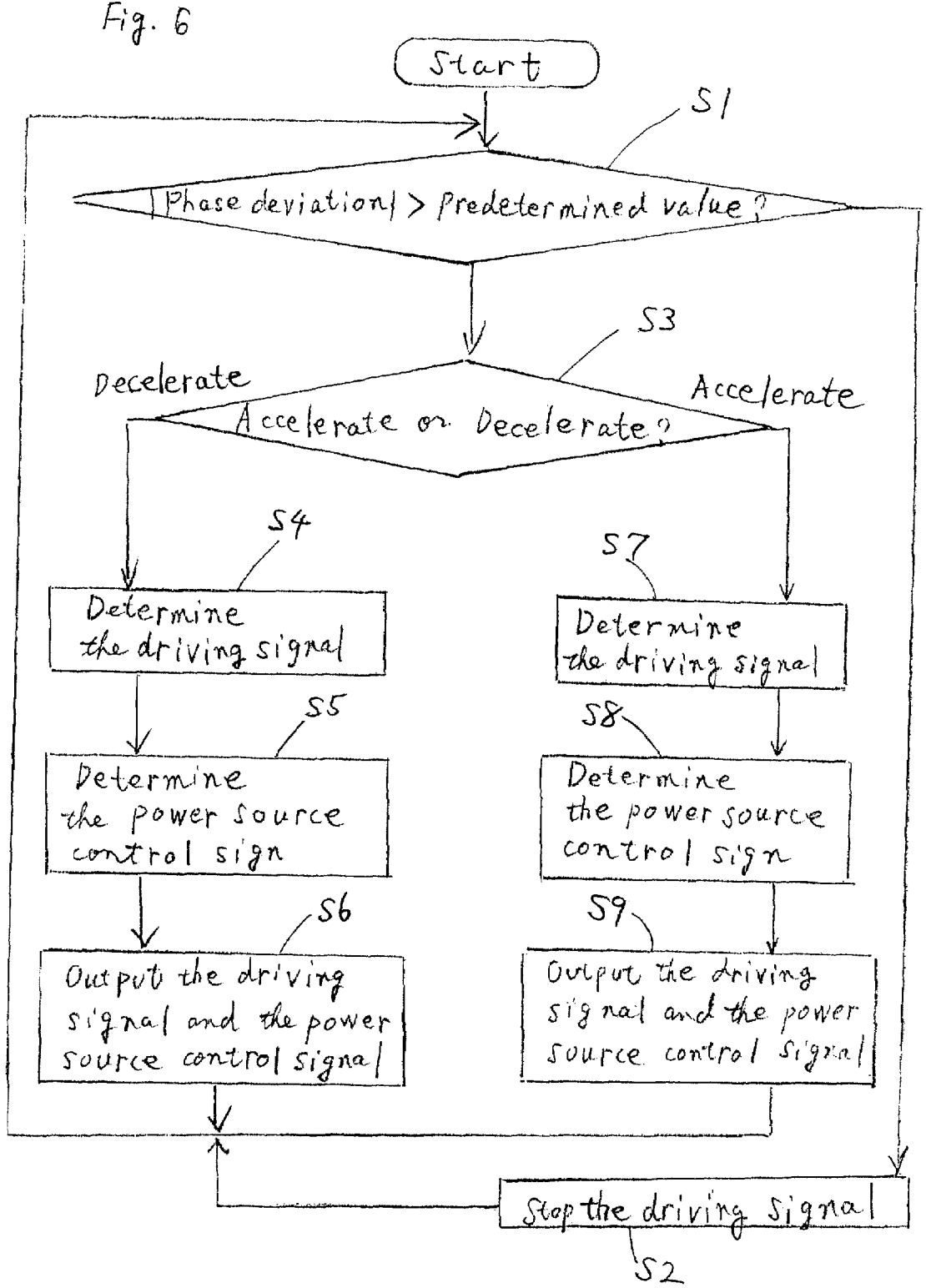
FIG. 6 is a flowchart for explaining the operation of the phase varying apparatus.
Figure 7:
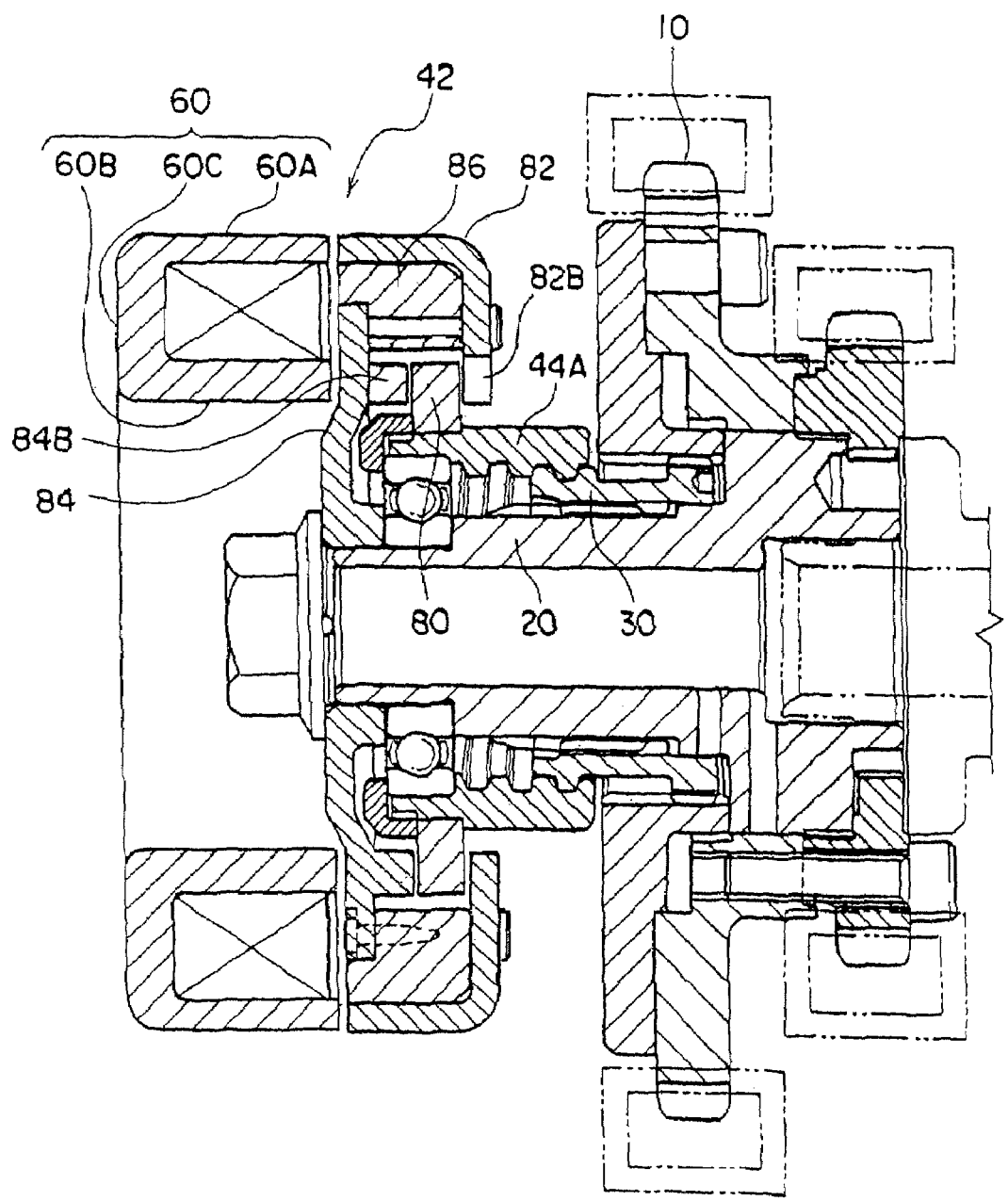
FIG. 7 is a view for explaining a second embodiment of the present invention.
Figure 8:
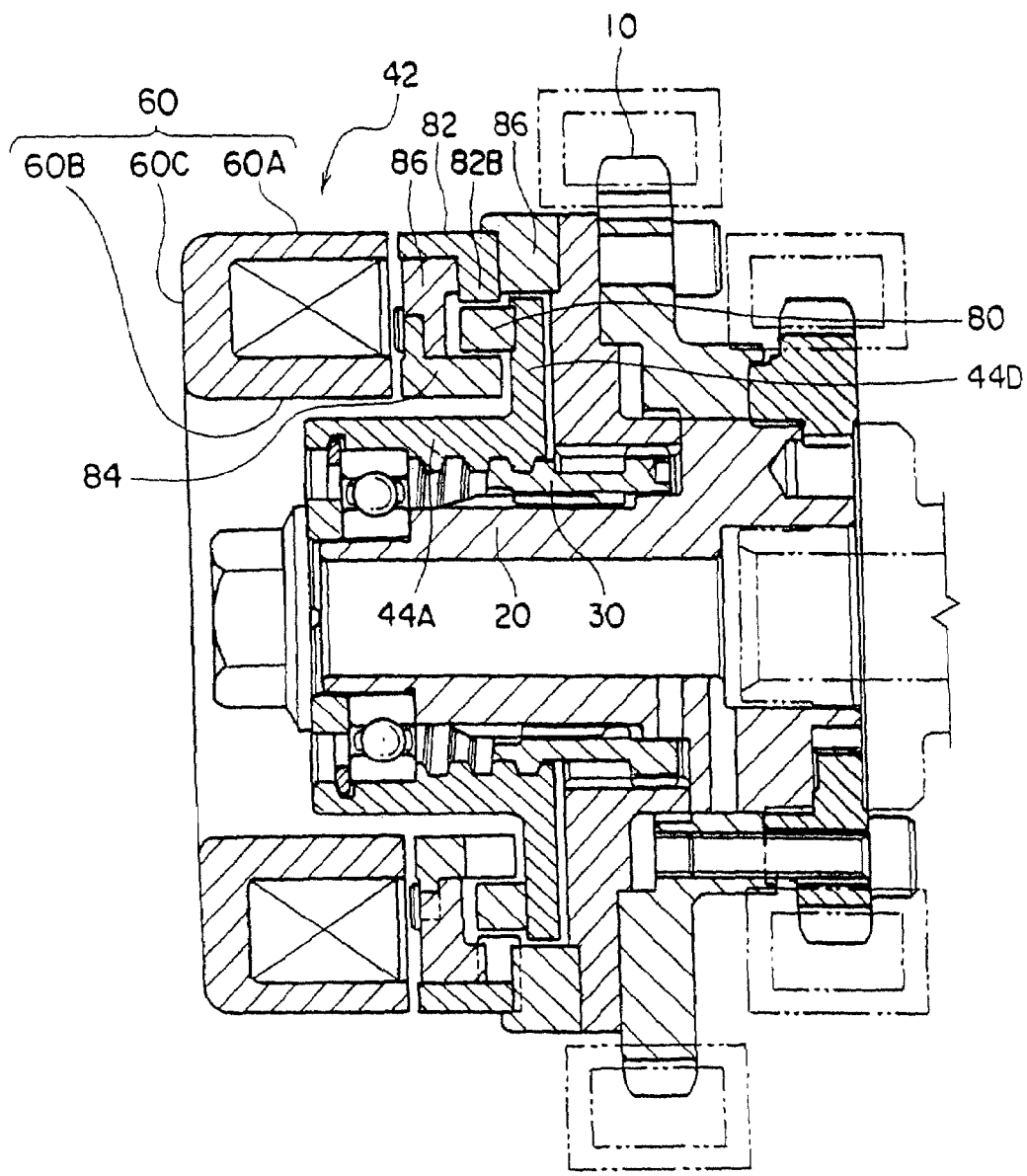
FIG. 8 is a view for explaining a third embodiment of the present invention.
Figure 9:
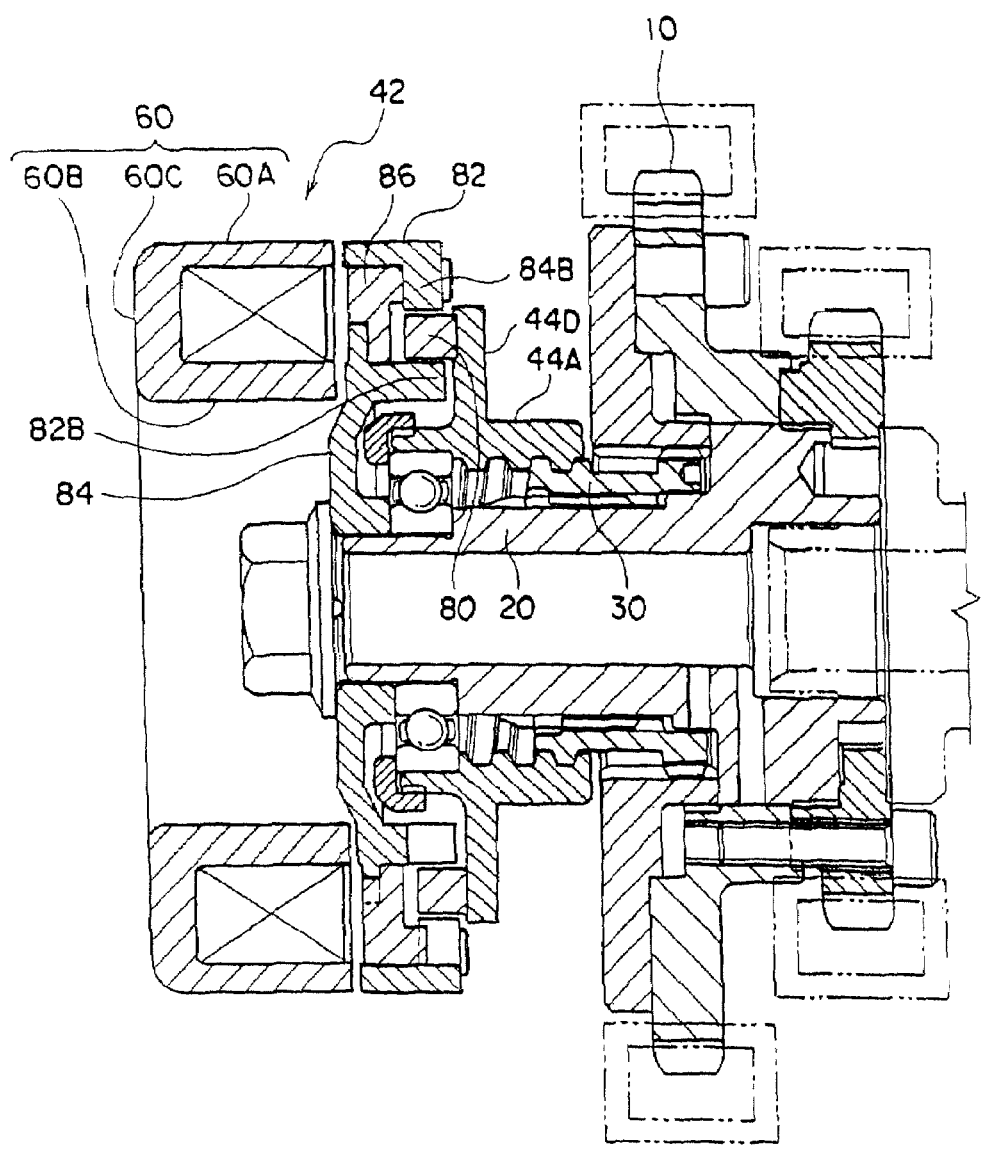
FIG. 9 is a view for explaining a fourth embodiment of the present invention.
Figure 10:
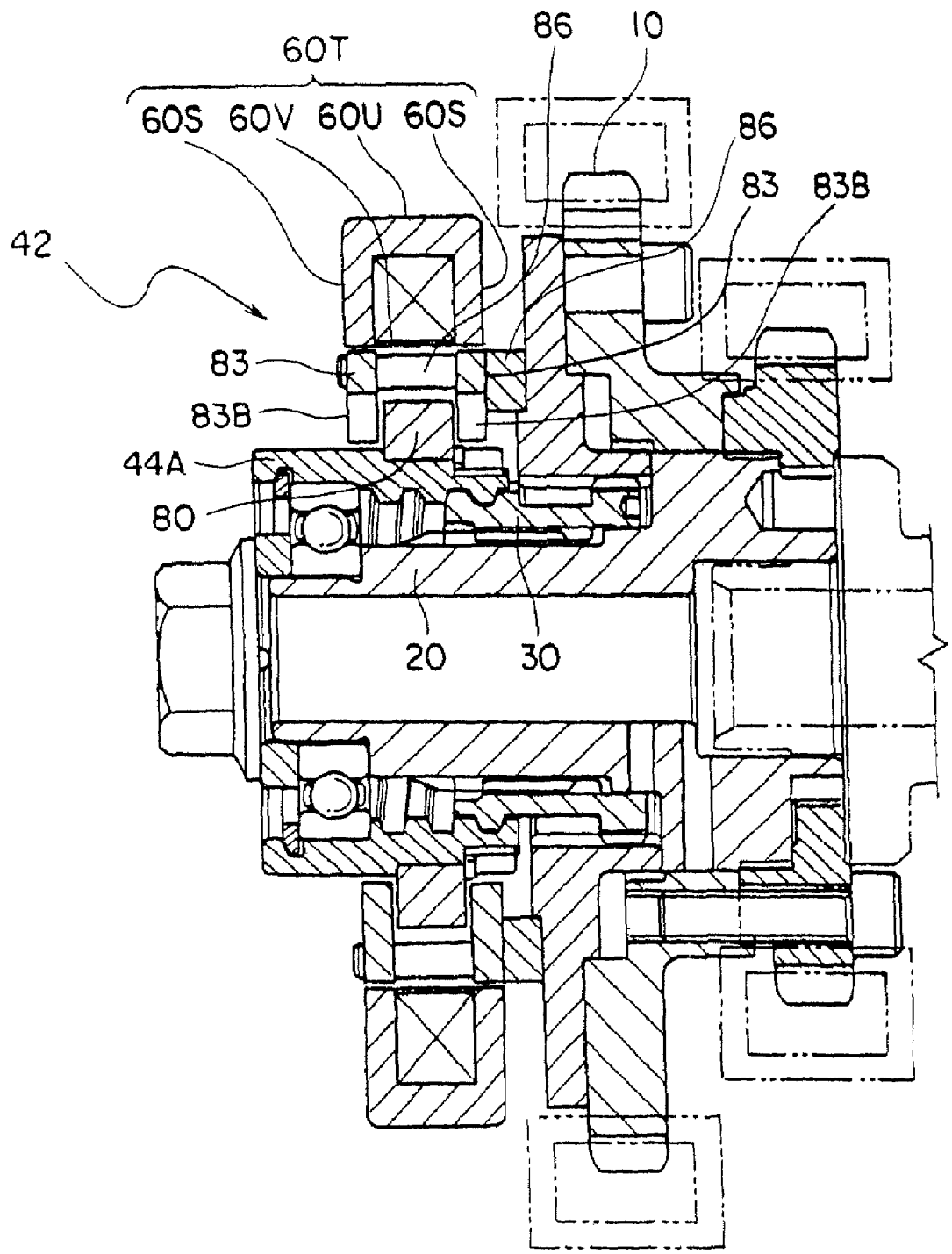
FIG. 10 is a view for explaining a fifth embodiment of the present invention.
Figure 11:
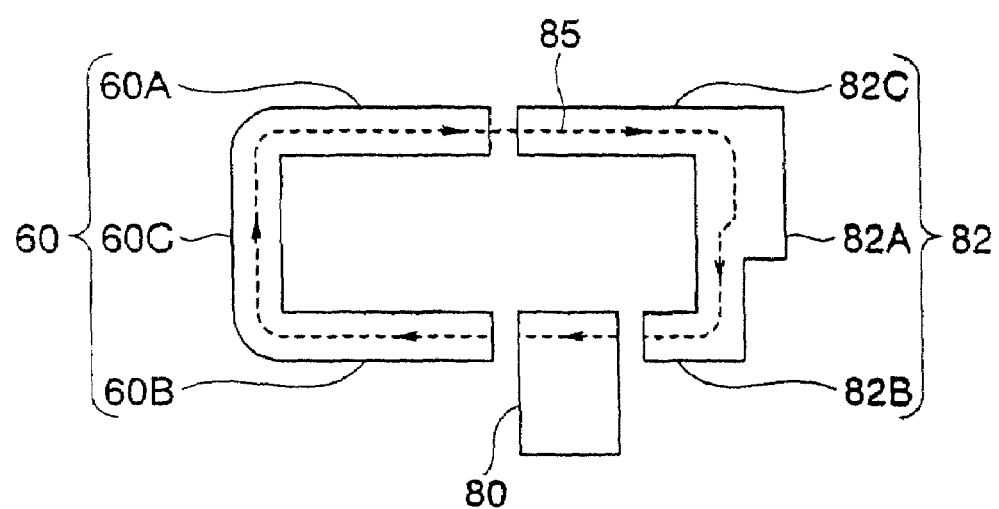
FIG. 11 is a view for explaining still another embodiment of the present invention.
Figure 12:
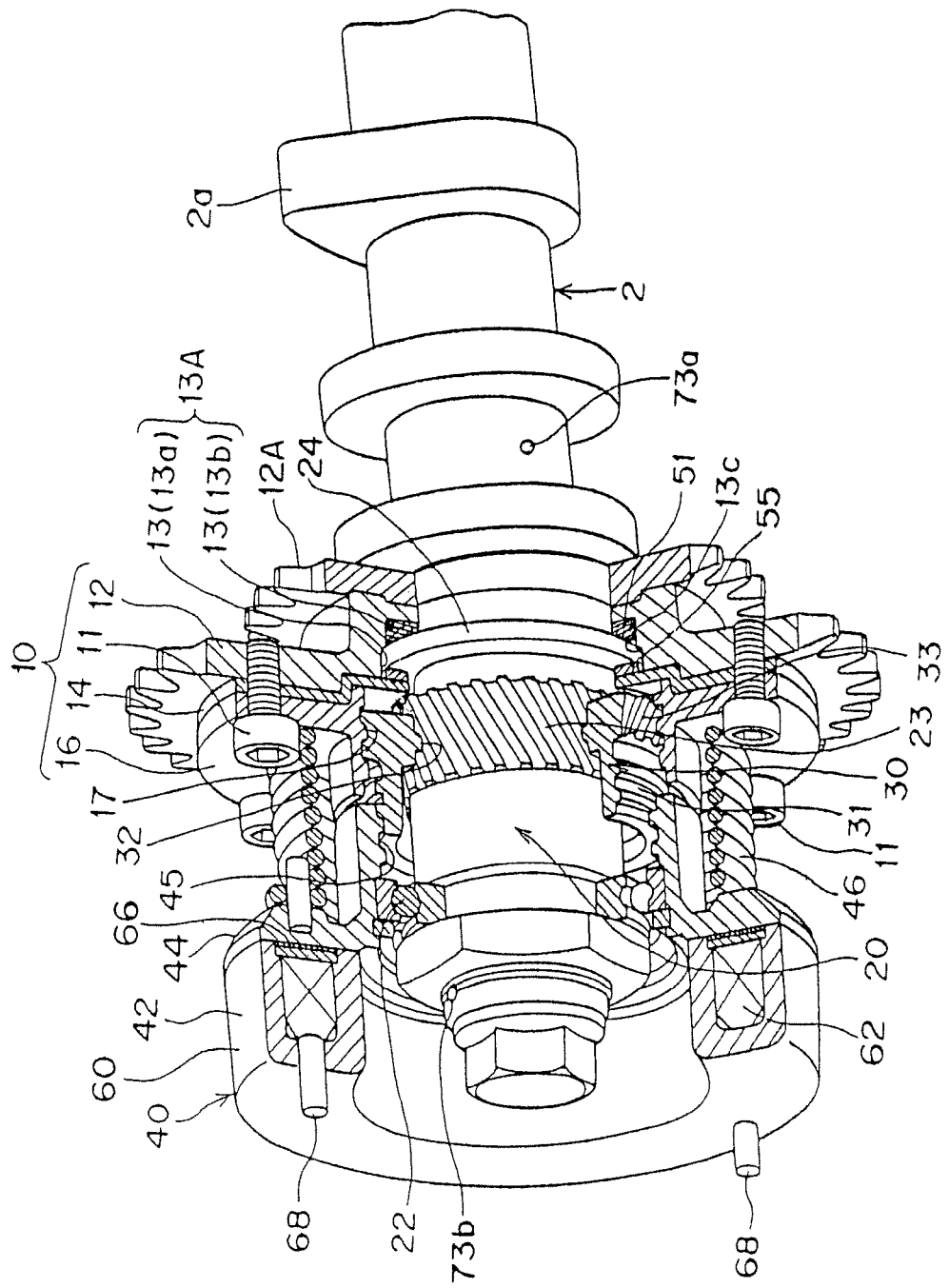
FIG. 12 is a view for explaining the structure of a conventional phase varying apparatus.

2: Camshaft
10: Outer cylinder part
20: Inner cylinder part
30: Intermediate member
42: Electromagnetic clutch
44A: Rotary drum
60: Clutch case (Iron core)
62: Coil
80: Magnet
82: Outer magnetic flux induction member
83: Annular magnetic flux induction member
84: Inner magnetic flux induction member
82B, 83B, 84B: Claw
85: Magnetic path
86: Spacer

The invention claimed is:

1. A phase varying apparatus for use with an engine, the phase varying apparatus comprising:
    an outer cylinder part to which the rotation of a crankshaft of the engine is transmitted;
    an inner cylinder part that is rotatable relative to the outer cylinder part and that is connected to a camshaft used to open and close an intake valve or an exhaust valve of the engine; and
    an intermediate member interposed between the outer cylinder part and the inner cylinder part;
    the phase varying apparatus varying an opening/closing timing of the intake valve or the exhaust valve while creating relative rotations between the outer cylinder part and the inner cylinder part by means of an action of the intermediate member;
    wherein the improvement comprises:
    a rotary drum that drives the intermediate member;
    an electromagnetic clutch including a plurality of magnets that are fixedly arranged at predetermined intervals along a circumferential direction of the rotary drum and that are magnetized alternately in opposite directions and a coil wound around an iron core; and
    a magnetic flux induction member that is made of ferromagnetic material and that has a plurality of claws each of which is close to a magnetic pole of the magnet, the magnetic flux induction member having a slight gap formed between the iron core and the magnetic flux induction member and having a magnetic path made up of the iron core and the magnets; and
    wherein the magnetic flux induction member is fixed to the outer cylinder part or to the inner cylinder part, and the rotary drum is accelerated and decelerated by a magnetic force exerted on the magnet by means of the claw, and the intermediate member is driven while controlling an ON state, an OFF state, and a direction of an electric current to be supplied to the coil.

2. The phase varying apparatus according to claim 1, wherein the iron core is an annular body having a U-shaped cross-section and consisting of an outer wall part, an inner wall part formed coaxially with the outer wall part, and a bottom part through which the outer wall part and the inner wall part are connected together,
    the coil is wound around the inner wall part,
    the magnetic flux induction member consists of an outer magnetic flux induction member and an inner magnetic flux induction member,
    the outer magnetic flux induction member includes an annular outer wall part close to a forward end of the outer wall part and a plurality of claws close to one of the magnetic poles of the magnet, and
    the inner magnetic flux induction member includes an annular part close to a forward end of the inner wall part and a plurality of claws close to the other one of the magnetic poles of the magnet.

3. The phase varying apparatus according to claim 1, wherein the iron core is an annular body whose opening part faces the magnet,
    the iron core is located outside the magnet and has a U-shaped cross-section having a pair of sidewall parts and a bottom part through which the sidewall parts are connected together,
    the magnetic flux induction member consists of a pair of annular magnetic flux induction members a peripheral edge part of each of which is brought close to a forward end of each of the pair of sidewall parts,
    one of the pair of annular magnetic flux induction members has a plurality of claws coming close to one of the magnetic poles of the magnet, and
    the other one of the pair of annular magnetic flux induction members has a plurality of claws coming close to the other one of the magnetic poles of the magnet.

4. The phase varying apparatus according to claim 2, wherein the pairs of magnetic flux induction members are connected together via a non-magnetic spacer.

5. The phase varying apparatus according to claim 1, wherein the electromagnetic clutch is provided with a position sensor that detects a position of the claw that has come closest to the position sensor and a magnetic sensor that detects a magnetic pole of the magnet that has come closest to the magnetic sensor.

6. The phase varying apparatus according to claim 1, wherein a magnitude of an electric current to be supplied to the coil is also controlled.

* * * * *